US005846154A

United States Patent [19]

Godin

[11] Patent Number: 5,846,154

[45] Date of Patent: Dec. 8, 1998

[54] SINGLE SPEED GEAR ASSEMBLY FOR A WHEELCHAIR

[75] Inventor: Gary Godin, Dalhousie, Canada

[73] Assignee: Handycare

[21] Appl. No.: 732,783

[22] Filed: Oct. 15, 1996

[51] Int. Cl.[6] .................... F16H 57/08

[52] U.S. Cl. .................... 475/331; 475/349; 74/607; 280/250.1

[58] Field of Search .................... 280/250.1; 475/331, 475/317, 349; 74/607, 413

[56] References Cited

U.S. PATENT DOCUMENTS

| | | | |
|---|---|---|---|
| 658,718 | 9/1900 | Cardinell | 475/349 X |
| 3,563,568 | 2/1971 | Sasse et al. . | |
| 3,686,978 | 8/1972 | Knoblach et al. | 475/296 |
| 4,002,088 | 1/1977 | Alsch | 475/349 X |
| 4,641,551 | 2/1987 | Pascaloff | 74/337 X |
| 4,682,784 | 7/1987 | Anderson . | |
| 4,727,965 | 3/1988 | Zach et al. . | |
| 4,762,332 | 8/1988 | Seol . | |
| 5,154,676 | 10/1992 | Kim | 475/317 |
| 5,160,156 | 11/1992 | Mendon . | |
| 5,167,168 | 12/1992 | Beumer . | |
| 5,362,081 | 11/1994 | Beidler et al. | 280/250.1 |
| 5,482,305 | 1/1996 | Jeffries et al. | 475/331 X |
| 5,486,016 | 1/1996 | Godin et al. | 280/250.1 |
| 5,632,499 | 5/1997 | Hutcherson et al. | 280/250.1 X |

*Primary Examiner*—Rodney H. Bonck
*Assistant Examiner*—Peter T. Kwon
*Attorney, Agent, or Firm*—Ian Fincham

[57] ABSTRACT

A single speed gear assembly suitable for use in a wheelchair is disclosed. The assembly incorporates a sun gear together with a plurality of planet gears which reduces the amount of torque required by the user in order to effect rotation of the wheel to which the assembly is attached. Specific ratios for the diameter of the sun gear to the each planet gear is taught. The assembly conveniently eases the use of a wheelchair by those confined to using same.

18 Claims, 2 Drawing Sheets

SINGLE SPEED GEAR ASSEMBLY FOR A WHEELCHAIR

FIELD OF THE INVENTION

The present invention relates to a gear assembly for use in a wheelchair and more particularly, the present invention relates to a single speed gear assembly capable of reducing the torque necessary by the user to effect rotation of the wheel.

BACKGROUND OF THE INVENTION

Geared hub arrangements and gear assemblies for wheelchair use have been previously proposed in the art. Typical of the references known is U.S. Pat. No. 4,729,965 issued to Zach et al., Mar. 1, 1988. In the reference, geared hub with a free wheel especially for wheelchairs is provided wherein the system has at least one forward speed with an active hub brake and one reverse speed. The system is fairly complicated and employs a ratchet gear assembly. In view of the number of moving parts in such an assembly, the same not only would be fairly expensive to manufacture but also would appear to be maintenance intensive.

Seol, in U.S. Pat. No. 4,762,332, issued Aug. 9, 1988, discloses a wheelchair having a propulsion and velocity change mechanism in which the mechanism provides a clutch with a cam clutch, a cylindrical fly wheel, both of which are installed on a hub of a shaft of the main wheel of the chair. A forward and backward selector is additionally provided to direct the operation and this is actuated via a wire.

U.S. Pat. No. 5,167,168, issued Dec. 1, 1992 to Beumer, provides a driving gear for a wheelchair in which the arrangement is drivable via a lever coupled to at least two free wheel clutches. Although the arrangement is useful, it relies on a lever to operate in the reverse direction and thus adds complication to the system.

It would be desirable if there were an arrangement whereby the assembly was simple and reduced the amount of torque required to produce a relatively high degree of work at the output. The present invention is directed to satisfying this need and overcomes the limitations of the prior art.

SUMMARY OF THE INVENTION

According to one object of the present invention, there is provided a torque reducing gear assembly suitable for use in a wheelchair, comprising:

a hollow hub;

axle extending through the hub, the axle having an inner end and an outer end and means rotatably mounting the hub on the axle;

a sun gear fixed to the axle;

a plurality of planet gears in spaced relation relative to one another and in meshing contact with the sun gear; and a drive gear for driving the planet gears, the drive gear meshing with the planet gears, whereby a reduced torque is required to effect rotation of the drive gear of the hub.

It has been found that by making use of a plurality of planet gears about a sun gear, in a single speed gear assembly reduces the amount of work or torque required to rotate the wheel shaft. This is of significant advantage to persons who must use a wheelchair since less strain and muscle power is required to move the chair. This is particularly advantageous when the user must go up a positive incline where a significnt amount of energy is demanded by the user.

As an added advantage, the entire assembly or portions thereof, may be composed of suitable plastics or other lightweight materials, e.g., metals and/or composites. This has the obvious advantage of reducing the mass of the overall apparatus and therefore the burden on the user.

As will be appreciated, there is a significant amount of variation that can take place with respect to the sun and planet gears. Typically, the ratio of the diameter of the sun gear relative to the planet gear will be anywhere from about 1:0.7 to about 1:0.55. As will be appreciated by those skilled in the art, the greater the diameter of the planet gear relative to the sun gear, the greater the reduction in torque required to effect rotation. A preferred range in ratio is from about 1:0.69 to about 1:0.57.

According to a further object of the present invention, there is provided a wheel assembly for a wheelchair having a frame member on each side of the seat, comprising:

a hollow hub;

a wheel mounted on the hub;

axle extending through the hub, the axle having an inner end and an outer end and means rotatably mounting the hub on the axle;

means for fixedly mounting the axle at its inner end on a frame member of a wheelchair;

a single speed gear assembly including:

a sun gear fixed to the axle;

a plurality of planet gears in spaced relation relative to one another and in meshing contact with the sun gear;

a drive gear meshing with the planet gears, the drive gear for driving the planet gears; and a hand wheel mounted on the drive gear, whereby a reduced torque is required at the handwheel to effect rotation of the wheel.

Any number of planet gears may be incorporated in the assembly and this will only be limited by the available space between the ring gear associated with the drive gear and the sun gear. By the ratios indicated, the most effective assembly can be manufactured resulting in an easy to use and inexpensive arrangement. Where the assembly is used with a motor drive, less demand is experienced by the motor in terms of its duty cycle and therefore the wear is significantly reduced.

A further object of the invention is to provide a torque reducing single speed gear assembly suitable for use in a wheelchair, comprising:

a hollow hub;

axle extending through the hub, the axle having an inner end and an outer end and means rotatably mounting the hub on the axle;

a sun gear fixed to the axle;

a plurality of planet gears in spaced relation relative to one another and in meshing contact with the sun gear, the sun gear having a diameter relative to a planet gear of the planet gears in a ratio of about 1:0.7 to about 1:0.55; and a drive gear for driving the planet gears, the drive gear meshing with the planet gears, whereby a reduced torque is required to effect rotation of the drive gear of the hub.

Having thus described the invention, reference will now be made to the accompanying drawings illustrating preferred embodiments.

BRIEF DESCRIPTION OF THE DRAWINGS

Similar numerals in the drawings denote similar elements.

DETAILED DESCRIPTION OF THE DRAWINGS

Figure 1:
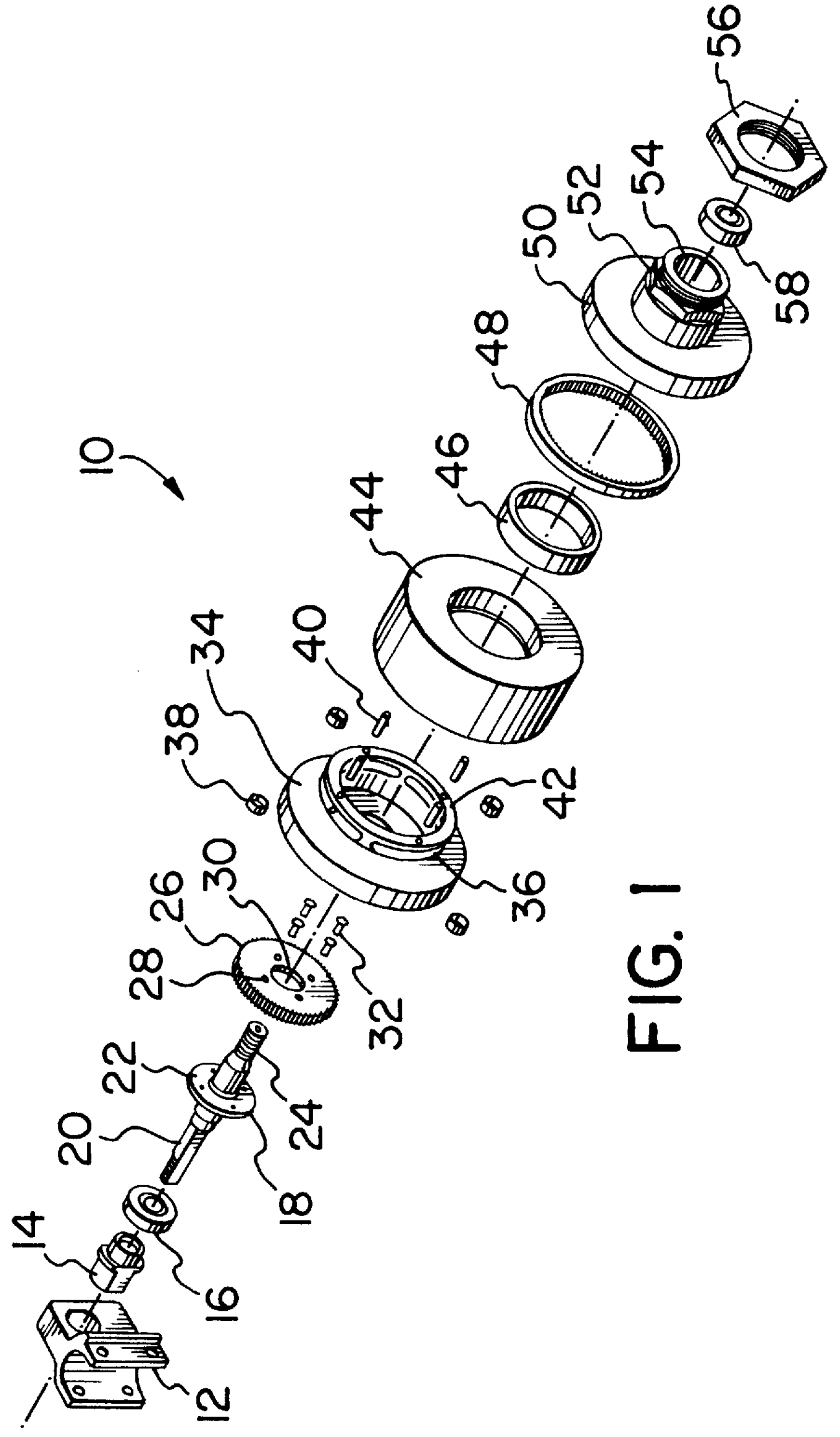
FIG. 1 is an exploded view of one embodiment of the gear assembly according to the present invention.

Referring now to FIG. 1, shown is an exploded view of one embodiment of the present invention. The entire assembly is globally denoted by numeral 10. A wheelchair clamp is provided at one end, the clamp being denoted by numeral 12, into which is positioned an anti-rotation bushing 14. Anti-rotation bushing 14 provides a peripheral skirt and is received within an opening in the wheelchair clamp, while bearing 16 fits over anti-rotation bushing 14. An axle, globally denoted by numeral 18, provides an outer end 20 adapted for connection with a wheelchair wheel (not shown and discussed hereinafter), the outer end 20 being threaded. The axle includes a central flange 22 and an inner end 24, inner end 24 being threaded for connection purposes with other elements to be discussed hereinafter. A sun gear 26 is provided with a series of apertures 28 surrounding a central opening 30, the central opening 30 for positioning on outer end 24 of shaft 18 and more specifically directly against flange 22. Flange 22 is provided with similar apertures 28 on sun gear 26. The apertures on flange 22 and those apertures 28 are register and fasteners 32 fixedly secure the sun gear 26 to flange 22. A planet gear cage 34 is provided within which is coaxially disposed and extending outwardly therefrom planet gear 26. The planet gear cage 34, as is typical with this type of mechanical component, provides a generally annular slot 36 within which are disposed a series of four planet gears 38. The gears 38 are rotatably fastened within the annular slot via planet gear pins 40 which extend into the annular slot 36 within which is disposed apertures 42 for receiving the pins 40.

Figure 2:
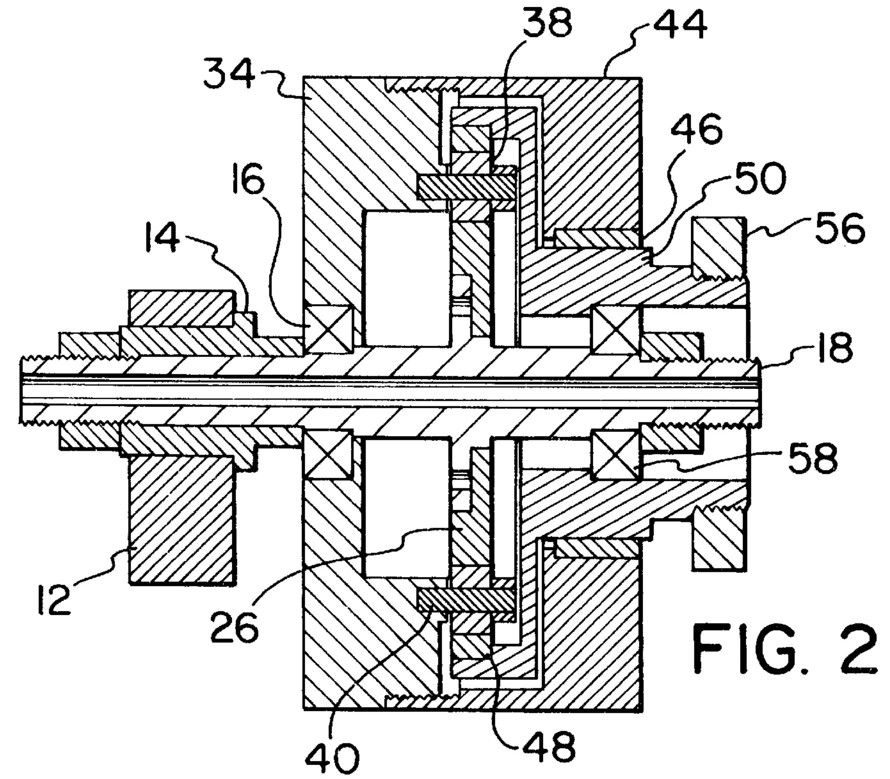
FIG. 2 is a sectional view of the assembly shown in FIG. 1.

A hub 44 is provided on the assembly and fits over cage 34 in order to protect the entire assembly discussed thus far from debris, damage, etc. Disposed within hub 44 is provided a bushing 46. A ring gear 48, which is fixedly secured within a driver 50, is in meshing contact with the planet gears 38. Driver 50 employs a nut portion 52, which nut portion additionally provides a threaded segment 54. A nut 56 cooperatively engages the threaded portion 54 on driver 50. A bushing 58 is positioned within the apertured driver member 50. FIG. 2 illustrates the arrangement in assembled form.

Figure 3:
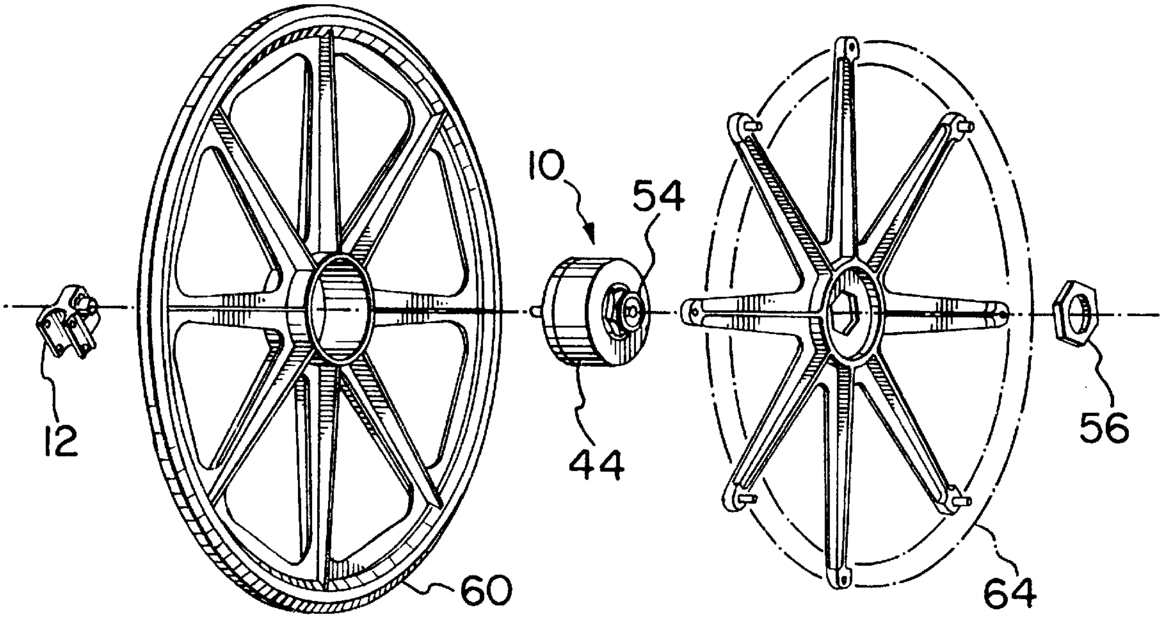
FIG. 3 is an expanded view of the assembly as it would be positioned on a wheelchair wheel.

Referring now to FIG. 3, shown is an exploded view of the assembly as positioned on a wheelchair wheel 60.

In operation, the force applied to driver 50 within which is disposed ring gear 48 causes the planet gear 38 and hub 44 to turn about axle 18. Hub 44 and planet cage 34 are fixed in the wheelchair wheel 60 (FIG. 3) thus driving the wheel upon rotation of wheel 60.

The result of this arrangement is that the force required to induce rotation to the shaft or axle 18 is significantly reduced and therefore makes use of the wheelchair abundantly easier for persons confined to the chair. The arrangement effectively reduces the force required to rotate the wheel of the wheelchair assembly. The degree of multiplication will be dependent upon the ratio of a planet gear to the sun gear. As an example, the ratio of the sun gear diameter to the planet gear diameter may vary from approximately 1:0.7 to about 1:0.55 with a typical range being 1:0.69 to about 1:0.57. In addition, it will be appreciated by those skilled in the art, that the number of planet gears 38 can vary and generally speaking, the larger the planet gear relative to the sun gear, the greater the degree of ease of rotation realized by the user.

Accordingly, the present invention has provided significant utility relative to a gearless wheelchair wheel assembly since the same amount of force applied to each of these wheels would result in a greater speed output on the wheel incorporating the gear assembly according to the present invention.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A torque reducing single speed gear assembly suitable for use in a wheelchair, comprising:

a hollow hub;

axle extending through said hub, said axle having an inner end and an outer end and means rotatably mounting said hub on said axle;

a sun gear fixed to said axle;

a plurality of planet gears in spaced relation relative to one another and in permanent meshing contact with said sun gear; and a drive gear for driving said planet gears, said drive gear meshing with said planet gears, whereby a reduced torque is required to effect rotation of said drive gear of said hub.

2. The gear assembly as set forth in claim 1, wherein said drive gear includes a ring gear.

3. The gear assembly as set forth in claim 2, wherein said ring gear is fixedly and permanently secured within said drive gear.

4. The gear assembly as set forth in claim 1, wherein said plurality of planet gears comprises four planet gears.

5. The gear assembly as set forth in claim 4, wherein said planet gears are mounted within a planet cage.

6. The gear assembly as set forth in claim 5, wherein said sun gear has a diameter relative to a planet gear in a ratio of about 1:0.7 to about 1:0.55.

7. The gear assembly as set forth in claim 6, wherein said sun gear has a diameter relative to a planet gear in a ratio of about 1:0.69 to about 1:0.57.

8. The gear assembly as set forth in claim 7, wherein said sun gear has a diameter relative to a planet gear said ratio is 1:0.57.

9. The gear assembly as set forth in claim 1, wherein said assembly includes a bushing member interposed between said hub and said drive gear.

10. A wheel assembly for a wheelchair having a frame member on each side of the chair, comprising:

a hollow hub;

a wheel mounted on said hub;

axle extending through said hub, said axle having an inner end and an outer end and means rotatably mounting said hub on said axle;

means for fixedly mounting said axle at its inner end on a frame member of a wheelchair;

a single speed gear assembly including:

a sun gear fixed to said axle;

a plurality of planet gears in spaced relation relative to one another and in permanent meshing contact with said sun gear;

a drive gear meshing with said planet gears, said drive gear for driving said planet gears; and a hand wheel mounted on said drive gear, whereby a reduced torque is required at said handwheel to effect rotation of said wheel.

11. The gear assembly as set forth in claim 10, wherein said drive gear includes a ring gear.

12. The gear assembly as set forth in claim 11, wherein said ring gear is fixedly and permanently secured within said driver.

13. The gear assembly as set forth in claim 10, wherein said plurality of planet gears comprises four planet gears.

14. The gear assembly as set forth in claim 13, wherein said planet gears are mounted within a planet cage.

15. The gear assembly as set forth in claim 14, wherein a planet gear of said planet gears has a diameter relative to a diameter of said ring gear in a ratio of about 1:0.7 to about 1:0.55.

16. The gear assembly as set forth in claim 16, wherein said sun gear has a diameter relative to a planet gear in a ratio of about 1:0.69 to about 1:0.57.

17. The gear assembly as set forth in claim 10, wherein said assembly includes a bushing member interposed between said hub and said drive gear.

18. A torque reducing single speed gear assembly suitable for use in a wheelchair, comprising:

a hollow hub;

axle extending through said hub, said axle having an inner end and an outer end and means rotatably mounting said hub on said axle;

a sun gear fixed to said axle;

a plurality of planet gears in spaced relation relative to one another and in permanent meshing contact with said sun gear, said sun gear having a diameter relative to a planet gear of said planet gears in a ratio of about 1:0.7 to about 1:0.55; and a drive gear for driving said planet gears, said drive gear meshing with said planet gears, whereby a reduced torque is required to effect rotation of said drive gear of said hub.

* * * * *